J. McAdams.
Numbering Mach.
No. 523. Reissued Jan. 26. 1858.
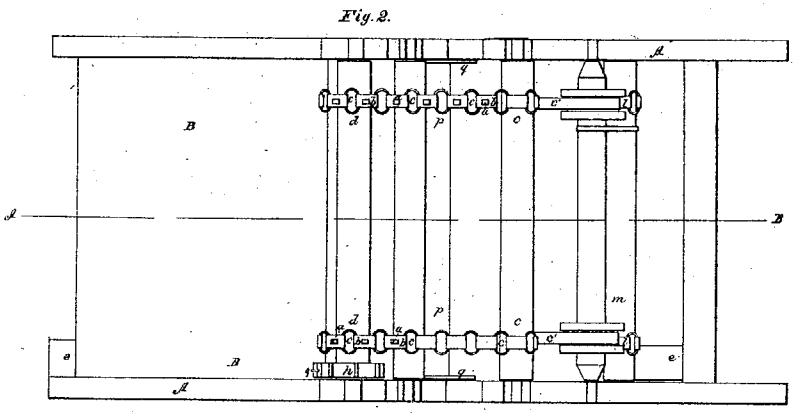
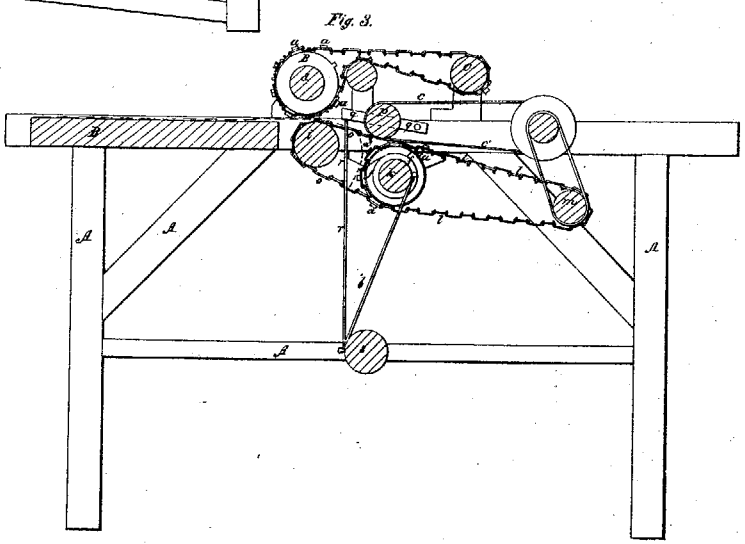
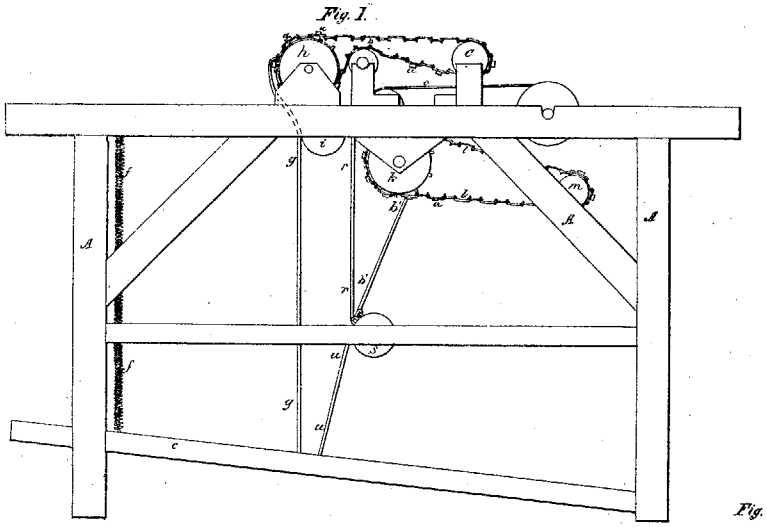

BEST AVAILABLE COPY

UNITED STATES PATENT OFFICE.

JOHN McADAMS, OF BOSTON, MASSACHUSETTS.

IMPROVEMENT IN MACHINES FOR NUMBERING THE PAGES OF ACCOUNT-BOOKS.

Specification forming part of Letters Patent No. 8,291, dated August 12, 1851; Reissue No. 523, dated January 26, 1858.

*To all whom it may concern:*

Be it known that I, JOHN McADAMS, of Boston, in the county of Suffolk and State of Massachusetts, have invented a new and useful Machine for Numbering the Pages of Account-Books; and I do hereby declare that the following is a full, clear, and exact description of the same, reference being had to the accompanying drawings, forming part of this specification, in which—

Figure 1 is a side elevation of the machine. Fig. 2 is a plan of the same. Fig. 3 is a longitudinal vertical section of the same, taken in the plane indicated by the line A B of Fig. 2.

Similar letters of reference indicate corresponding parts in the several figures.

The object of my invention is to effect the paging of account-books in an expeditious and accurate manner, so that the pile of sheets for a book of any number of pages may be passed through the machine and have the number of each successive page printed in any colored ink in proper position in the upper corner of each margin of the sheet and on both sides.

A A A in the several views represent the frame-work of the machine. B B is the platform on which the sheets (represented by red lines in Fig. 3) are placed to be fed into the machine. The types *a a*, with the various numbers on their faces for printing the sheets on one side, are set in the blocks *b b*, which are connected by links *c c*, so that the said blocks and links form two parallel chains *b b c c b b c c*, containing two continuous lines of types. Two lines of types are used for the purpose of printing simultaneously two corners of one side of a sheet, each side of a sheet forming two pages of the book when the sheet is folded. The links *c c* of the two chains fit over proper teeth on the peripheries of circular plates on each end of the imprinting-cylinder *d*, Figs. 1, 2, 3, which cylinder prints the numbers on the two corners of the upper side of the sheet by means of the types *a a*, the types being so arranged in the two chains as to accommodate the folding of the sheets in the binding of the book and the number of sheets used in a fold, so that when the book is bound the numbers of the pages will follow each other in proper order, and the chains being stretched round the cylinders *d* and C, as shown in the drawings. The imprinting-cylinder *d* is turned by means of the treadle *e*, which works on a proper fulcrum in the frame-work and is drawn up after each impression by the spiral spring *f*. (Shown in Fig. 1.) This treadle acts upon the imprinting-cylinder through the agency of an elongated hooked pawl, *g*, which projects upward from the treadle, and whose hooked end engages with the teeth of the ratchet-wheel *h* on the imprinting cylinder. The sheets are fed up separately from the table B B until their edges abut against the edges of the two types which have just made impressions. The treadle is then depressed and turns the imprinting-cylinder *d* until the succeeding two types come into proper position, when the sheet is fed along by hand and the impressions are produced against the periphery of the roller *i*, arranged just beneath the said imprinting-cylinder *d*. The two pages of the upper side of the sheet having been printed in this way, the sheet passes to the lower imprinting-cylinder, *k*, round which and round a cylinder, *m*, both parallel with cylinders *d* C, there are stretched two type-chains, *l l*, carrying the types for printing the two corners of the lower sides of the sheets, said type chains being similar to those before described for printing the upper sides of the sheets. The imprinting-cylinder *k* is turned at proper intervals by means of a chain-belt, O, which passes from the roller *i* to it, said roller *i* being turned by the pressure on it of the upper type-chains as they are moved by the action of the treadle. The second impression—that is to say, the impression on the under side of each sheet—is produced by means of a roller, *p*, whose journals are arranged in swinging boxes *q q*. (See Figs. 2 and 3.) These boxes are connected by rods *r r* to the periphery of a drum, S, as shown in Figs. 1 and 3, which has a rocking motion imparted to it from the treadle *e* by means of the rod *u*, (see Fig. 1,) connecting its periphery with the treadle. The depression of the treadle draws down these boxes, and consequently the roller *p*, which is thus caused to press the sheet on the face of the types in the two type-chains *l l*, and produces the impression on the under side of the sheet. After the under side of a sheet has been printed, as above described, the sheet is conveyed downward behind the cylinder *k* by means of studs or pins *a'*, secured in wheels *f f*, which are fitted to turn loosely on the said cylinder. The manner in which this is effected is illustrated by the position in which the pins and the sheet are shown in red dotted outlines in Fig. 3. The wheels *f f* are turned to effect this after the impression and when the treadle rises, by means of rods *b' b'*, which connect the said wheels with the periphery of the drum S. There should be bands of mole-skin, or other suitable soft substance, as shown at *c' c'*, passing round the roller *p*, against which the figures printed on the upper side of the sheet come, and on which a little of the ink is taken, but this is carried along on the band after each impression, and does not come back again until it is dry.

By the use of type-chains it will be apparent I am enabled to employ imprinting-cylinders of small diameter, so that the arrangement can be made conveniently for paging or printing on both sides of the sheets in one machine; but in lieu of these chains plates of large diameter may be fixed on each end of the imprinting-cylinders, with sockets for the types. In order, however, to print any considerable number of sheets, these plates must be of large diameter, and the machine unwieldly, while it would not probably be in a machine so arranged, convenient to print on more than one side at a time.

In the machine above-described an essential feature consists in a new principle or mode of arranging and operating numeral types for the paging of books—that is to say, arranging the types, of which there is a separate one for each of the several numbers from 1 to the highest number required to include all the pages of a book, in a serial order, in continuous lines one behind another, and bringing them successively and separately to a fixed position at the point of impression, where each meets its sheet and performs its work and then passes on out of the way, no more to be employed in the paging of the same book. The serial order in which the types are arranged may be varied according to the number of sheets used in a fold or section of a book. In printed books a "signature," as it is termed, makes a section of a book in binding, but in account-books there are no signatures, and the number of sheets or leaves in a section or fold may be varied to suit the thickness of the paper or any of the other conditions of the manufacture, and the succession of types must be varied according to the number of sheets, and is in a great measure arbitrary, as is well known to practical book-binders and printers.

Before the invention of my principle or mode of arranging and operating the numeral types, the mechanical means used for paging account-books consisted mainly of a number of plates with numbers cut, molded, or engraved upon them, arranged side by side and operated by a system of permutation, to print the higher numbers, when they are wanted, above the 9 digits or above the number 99. The necessity for this "permutation" system, as it is technically termed, is entirely obviated by my improved arrangement, and the types of the several numbers are brought successively, each independently of all others, to the numbering of their specific sides or pages of the leaves of the book, as hereinbefore specified, and by this means I am enabled to number two pages at a time on the same side of the sheet and to number the two sides of the sheet while it is passing once through the machine.

What I claim as my invention, and desire to secure by Letters Patent, is—

1. The mode of arranging and operating the numeral types for printing the pages of the whole book substantially as herein described—to wit, arranging the types of the several numbers from 1 to the highest number required in a serial order, in one or more continuous lines, one behind another, and bringing them up successively and separately to the point of impression, so that the type of each number is independent of all others and used alone and but once in the paging of the whole book, and all others are out of the way, and this I claim whether said types are fixed in a chain or chains or in any other manner by which the same system of operation is obtained.

2. Arranging two type-chains, or continuous lines of type parallel with each other, at a proper distance apart, and with the types in proper serial order and operating the same simultaneously, substantially as described, to print the numbers of two pages simultaneously on two opposite corners of the same side of a sheet.

3. The arrangement of two pairs of type-chains or continuous lines of type, substantially as described, to print the numbers of two pages on each side of a sheet while the sheet is passing once through the machine.

JOHN McADAMS.

Witnesses:
P. J. TUSCH,
J. W. COOMBS.